United States Patent Office 2,884,425
Patented Apr. 28, 1959

2,884,425

VAT DYESTUFFS AND PROCESS FOR THEIR MANUFACTURE

Maurice Grelat, Basel, Switzerland, assignor to Ciba Limited, Basel, Switzerland, a Swiss firm No Drawing. Application March 21, 1957
Serial No. 647,479

Claims priority, application Switzerland April 3, 1956

7 Claims. (Cl. 260—316)

This invention is based on the observation that valuable anthraquinone vat dyestuffs are obtained by reacting a 1:4-diaminoanthraquinone with a 1:4-dichloranthraquinone, if desired, with the addition of an α-monochloranthraquinone, and treating the linear polyanthrimide so obtained with a carbazolising agent in the presence of a tertiary base free from hydroxyl groups.

In the condensation it is of advantage to use at least 0.2 molecular proportions of a 1:4-dichloranthraquinone per molecular proportion of 1:4-diaminoanthraquinone. Furthermore, it is of advantage so to choose the molar ratio of all the reaction components relatively to one another that the ratio of the exchangeable chlorine atoms present in the reaction mixture to the amino groups present in the reaction mixture is at least 0.6:1. This means that when less than 0.6 mol of 1:4-dichloranthraquinone is used per mol of 1:4-diaminoanthraquinone it is of advantage to add a proportion of an α-monochloranthraquinone such that at least 60% of all the amino groups are saturated by condensation with α-chlorine atoms.

Especially useful products are obtained when the ratio of chlorine atoms to the amino groups in the reaction mixture is at least 0.8:1. The α-chloranthraquinone may be used in any desired proportion, but it is not of advantage that the ratio of the total chlorine atoms to the total amino groups should exceed 2:1, because the quality of the product cannot be improved by exceeding that ratio and yield may be impaired by doing so.

As the 1:4 diaminoanthraquinone it is of advantage to use 1:4-diaminoanthraquinone itself owing to the ease with which it can be obtained. However, 1:4-diamino-6:7-dichloranthraquinone may be used. As the 1:4-dichloranthraquinone there comes into consideration more especially 1:4-dichloranthraquinone itself, but 1:4:6-trichloranthraquinone and 1:4-dichlor-5-benzoylaminoanthraquinone may also be used. The chlorine atoms in β-position cannot enter into reaction under the reaction conditions given above.

As the α-monochloranthraquinone there is preferably used 1-chloranthraquinone, but 1-chloro-4-benzoylaminoanthraquinone or 1-chloro-4-aminoanthraquinone is also suitable.

When an α-monochloranthraquinone also takes part in the reaction, it may be present from the beginning of the reaction. However, the quality of the final product is considerably improved if the α-chloranthraquinone is added substantially only after the termination of the reaction of the other two components.

The condensation to form the polyanthrimides is advantageously carried out at a raised temperature, preferably in the presence of a high boiling solvent, for example, nitro-benzene or naphthalene, with the addition of an acid-binding agent, such as an alkali carbonate, and a catalytic amount of a copper salt or copper powder. The polyanthrimides so obtained contain at least four anthraquinone nuclei, in which all the anthrimide linkages are in 1:4-position relatively to one another.

As a carbazolysing agent there is principally used aluminum chloride.

The carbazolisation is carried out in a tertiary base at a temperature within the range of about 100° C. to 220° C., and advantageously 140° C. to 160° C. As tertiary bases there are used more especially cyclic bases, such as pyridine and its closest homologues, for example, a commercial mixture of β- and γ-picoline. There may also be used polycyclic bases, such as quinoline or acridine. The reaction mixture may be worked up in the usual manner, for example, by pouring the aluminum chloride melt into water or dilute caustic soda solution, and oxidising to the dyestuff any leuco-compound with an oxidising agent, for example, sodium hypochlorite or sodium meta-nitrobenzene sulphonate. In certain cases it may be of advantage to vat the dyestuff before it is separated by means of a suitable reducing agent, such as sodium hyposulfite, and to separate the dyestuff from the vat by oxidation, for example, with air.

The dyestuffs obtained by the process of this invention can be used as pigments or they may be used as such or in the form of leuco ester salts obtainable in known manner for dyeing or printing a very wide variety of materials especially fibers of natural or regenerated cellulose. The dyeings and prints possess valuable grey to greenish grey tints depending on the molar ratio of the starting materials used to make the dyestuffs. The dyeings possess excellent properties of fastness, and especially a very good fastness to light and chlorine. A further advantage of the dyestuffs obtained by the process of this invention is that they enable dyeings of the same tint to be produced whether the dyeing process is conducted at a high temperature or at a moderate temperature.

Processes are known for the manufacture of grey dyestuffs belonging to the series of linear polyanthrimidecarbazoles. However, these known processes necessitate the use of at least two stages for making the anthrimide starting from the mononuclear anthraquinone derivatives whereas the present process enables dyestuffs having at least equally good dyeing properties to be obtained in two process steps.

It is also known to condense 1:4-diaminoanthraquinone with 1:5-dichloranthraquinone and to carbazolise the polyanthrimide so obtained. In this process, however, there is obtained a mixture of brown dyestuffs which produces different tints depending on the dyeing method used.

The following examples illustrate the invention, the parts and percentages being by weight unless otherwise stated, and the relationship of parts by weight to parts by volume being the same as that of the kilogram to the liter:

Example 1

7.14 parts of 1:4-diaminoanthraquinone, 5.54 parts of 1:4-dichloranthraquinone, 6.4 parts of sodium carbonate, 0.3 part of cuprous chloride and 90 parts of nitrobenzene are heated for 16 hours at 200–205° C. while stirring. The whole is then allowed to cool to 60–70° C., filtered with suction, and the filter residue is washed first with nitro-benzene and then with alcohol. The crude product is extracted at the boil with 500 parts of hydrochloric acid of 5 percent strength, and the mixture is then filtered with suction and washed until the washings are neutral. There is obtained a black violet powder which dissolves in concentrated sulfuric acid with a green coloration.

32 parts of aluminum chloride are introduced at 20–100° C. into 64 parts of anhydrous pyridine while stirring. The whole is heated to 115–120° C. and there are then added 8 parts of the polyanthrimide obtained as described in the preceding paragraph. The temperature of the melt is raised to 139–141° C. The whole is stirred for 2 hours at 140° C., and the reaction mixture is then poured into 1000 parts of cold water. To the resulting suspension there are added 120 parts of a sodium hydroxide solution of 30 percent strength and the whole is heated while stirring to 100° C. The product is filtered off with suction and washed with water. The moist filter cake is pasted with 200 parts of hydrochloric acid of 5 percent strength and the whole is stirred for 30 minutes at 80-90° C. The dyestuff is then filtered off with suction, and washed neutral with water and dried. It is a dark powder which dissolves in concentrated sulfuric acid with a brown-black coloration, and dyes cotton fast olive grey tints.

*Example 2*

5 parts of 1:4-diaminoanthraquinone, 5 parts of 1:4-dichloranthraquinone, 7 parts of sodium carbonate, 0.4 part of cuprous chloride and 200 parts of nitrobenzene are heated for 16 hours at 200-205° C., while stirring. The whole is then allowed to cool to 60-70° C., and filtered with suction and the filter residue is washed with nitrobenzene and then with alcohol. The crude product is extracted at the boil with 500 parts of hydrochloric acid of 5 percent strength, the mixture is filtered with suction, and the filter residue is washed neutral. There is obtained a black violet product, which dissolves in concentrated sulfuric acid with a green coloration.

The polyanthrimide obtained in this manner is carbazolised in the manner described in the second paragraph of Example 1. The resulting dyestuff is a dark powder which dissolves in concentrated sulfuric acid with a brown-black coloration and dyes cotton fast olive-grey tints.

*Example 3*

7.14 parts of 1:4-diaminoanthraquinone, 11 parts of 1:4-dichloranthraquinone, 6.36 parts of sodium carbonate, 0.2 part of cuprous chloride, 0.2 part of copper acetate and 250 parts of nitrobenzene are condensed in the manner described in the first paragraph of Example 1, and the polyanthrimide so obtained is carbazolised as described in the second paragraph of Example 1 with the only modification that a commercial mixture of β- and δ-picoline is used instead of pyridine. The dyestuff so obtained is a dark powder which dyes cotton neutral grey tints.

*Example 4*

1.7 parts of 1-chloro-4-aminoanthraquinone, 4.76 parts of 1:4-diamino-anthraquinone, 5.56 parts of 1:4-dichloranthraquinone, 8 parts of sodium carbonate, 0.5 part of cuprous chloride aand 300 parts of nitrobenzene are heated for 14 hours at 200-205° C. while stirring. After cooling the mixture, it is filtered with suction, and the filter residue is washed with nitrobenzene and then with alcohol. The crude product is extracted at the boil with 500 parts of hydrochloric acid of 5% strength, then filtered off with suction and washed neutral. There is obtained an almost black powder, which dissolves in concentrated sulfuric acid with a green coloration. The polyanthrimide so obtained is carbazolised as described in Example 1. The dyestuff is a black powder, which dissolves in concentrated sulfuric acid with a brown-black coloration and dyes cotton from an orange-brown vat fast olive-grey tints.

*Example 5*

6 parts of 1:4-diaminoanthraquinone, 3.5 parts of 1:4-dichloranthraquinone, 7 parts of sodium carbonate, 0.2 part of cuprous chloride, 0.2 part of copper acetate and 110 parts of nitrobenzene are heated for 6 hours at 200-205° C. while stirring. 2 parts of α-chloranthraquinone are then added, and the reaction mixture is further stirred for 9 hours at the boiling temperature. The whole is allowed to cool to 50° C., then filtered with suction and the filter residue is washed with nitrobenzene and then with alcohol. The crude product is extracted at the boil with 500 parts of hydrochloric acid of 5% strength, then filtered with suction, and the filter residue is washed neutral and dried. The carbazolisation is carried out as described in the second paragraph of Example 1. The dyestuff so obtained dyes cotton from an orange-brown vat fast grey tints.

*Example 6*

6 parts of 1:4-diaminoanthraquinone, 3.5 parts of 1:4-dichloranthraquinone, 6.9 parts of sodium carbonate, 0.2 part of cuprous chloride, 0.2 part of copper acetate and 110 parts of nitrobenzene are heated for 6 hours at 200-205° C. while stirring. 9 parts of 1-chloro-4-benzoylaminoanthraquinone are then added, and the reaction mixture is further stirred for 9 hours at the boiling temperature. The whole is allowed to cool to 50° C., then filtered with suction, and the filter residue is washed first with nitrobenzene and then with alcohol. The crude product is extracted at the boil with 500 parts of hydrochloric acid of 5% strength, then filtered off with suction, washed neutral and dried. The carbazolisation is carried out as described in the second paragraph of Example 1.

The dyestuff so obtained dyes cotton from an orange-brown vat fast grey tints.

*Example 7*

7.75 parts of 1:4-diamino-6:7-dichloranthraquinone, 3.5 parts of 1:4-dichloranthraquinone, 6.9 parts of sodium carbonate, 0.2 part of cuprous chloride, 0.2 part of copper acetate and 110 parts of nitrobenzene are heated for 6 hours at 200-205° C. while stirring. 6 parts of 1-chloranthraquinone are then added, and the reaction mixture is further stirred for 9 hours at the boiling temperature. The product is worked up as described in Example 6. The carbazolisation is carried out as described in the second paragraph of Example 1. The dyestuff so obtained dyes cotton from a brown vat fast grey tints.

*Example 8*

9 parts of 1:4-diaminoanthraquinone, 3.5 parts of 1:4-dichloro-5-benzoylaminoanthraquinone, 7 parts of sodium carbonate, 0.3 part of cuprous chloride and 110 parts of nitrobenzene are heated for 6 hours at 200-205° C. while stirring. 6 parts of α-chloranthraquinone are then added, and the reaction mixture is further stirred for 9 hours at the boiling temperature. The product is worked up as described in Example 6. The carbazolisation is carried out as described in the second paragraph of Example 1. The dyestuff so obtained dyes cotton brownish grey tints.

If instead of 1,4-dichloro-5-benzoylamino-A an equimolecule proportion of 1,4,6-trichloroanthraquinone is used a dyestuff having similar properties is obtained.

*Example 9*

1.5 parts of the dyestuff obtained as described in the second paragraph of Example 1 are vatted with 6 parts by volume of a sodium hydroxide solution of 30 percent strength and 3 parts of sodium hydrosulfite in 100 parts of water at 40-50° C. The resulting stock vat is added to a dyebath, which contains in 2000 parts of water, 6 parts by volume of sodium hydroxide solution of 30 percent strength and 3 parts of sodium hydrosulfite, and 100 parts of cotton are entered at 40° C. After 15 minutes there are added 20 parts of sodium chloride, and dyeing is continued at 40-50° C. for one hour. The cotton is then squeezed, oxidised and finished in the usual manner. It is dyed a fast olive-grey tint.

What is claimed is:

1. A process for the manufacture of vat dyestuffs which comprises condensing one molecular proportion of a member selected from the group consisting of 1,4-diaminoanthraquinone and a chlorosubstituted 1,4-diamino anthraquinone with 0.2 to 2 molecular proportions of a member selected from the group consisting of 1,4- dichloroanthraquinone, a chlorinated 1,4-dichloroanthraquinone, and 1,4-dichlor-5-benzoylaminoantraquinone, and with 0–2 molecular proportions of a member selected from the group consisting of 1-chloro-4-aminoanthraquinone and 1-chloro-4-benzoylaminoanthraquinone, the molecular ratio of all the reaction components relatively to one another being so chosen that the ratio of the exchangeable chlorine atoms in the reaction mixture to the amino group therein is 0.6:1 to 2:1, and carbazolizing the so-obtained linear polyanthrimide with anhydrous aluminum chloride and a pyridine base at a temperature from 100 to 220° C.

2. A process for the manufacture of vat dyestuffs which comprises condensing at a raised temperature in the presence of a high boiling solvent and with the addition of an acid binding agent, one molecular proportion of a member selected from the group consisting of 1,4-diaminoanthraquinone and a chlorosubstituted 1,4-diaminoanthraquinone with 0.2 to 2 molecular proportions of a member selected from the group consisting of 1,4-dichloroanthraquinone, a chlorinated 1,4-dichloranthraquinone and 1,4-dichlor-5-benzoylaminoanthraquinone, and with 0–2 molecular proportions of a member selected from the group consisting of 1-chloroanthraquinone, 1-chloro-4-aminoanthraquinone and 1-chloro-4-benzoylaminoanthraquinone, the molecular ratio of all the reaction components relatively to one another being so chosen that the ratio of the exchangeable chlorine atoms in the reaction mixture to the amino group therein is 0.6:1 to 2:1, and carbazolizing the so-obtained linear polyanthrimide with anhydrous aluminum chloride and a pyridine base at a temperature from 100 to 220° C.

3. A process for the manufacture of a vat dyestuff which comprises condensing at a raised temperature in the presence of a high boiling solvent with the addition of an acid binding agent one mol of 1,4-diamino anthraquinone with one molecular portion of 1,4-dichloranthraquinone and carbazolizing the so-obtained linear polyanthrimide with anhydrous aluminum chloride and pyridine at a temperature between 100–220° C.

4. A process for the manufacture of a vat dyestuff which comprises condensing at a raised temperature in the presence of a high boiling solvent with the addition of an acid binding agent one mol of 1,4-diaminoanthraquinone with 0.5 mol of 1,4-dichloranthraquinone and 0.3 mol of 1-chloranthraquinone and carbazolizing the so-obtained linear polyanthrimide with anhydrous aluminum chloride and pyridine at a temperature between 100–220° C.

5. A process for the manufacture of a vat dyestuff which comprises condensing at a raised temperature in the presence of a high boiling solvent with the addition of an acid binding agent one mol of 1,4-diaminoanthraquinone with 0.5 mol of 1,4-dichloranthraquinone and 1 mol of 1-chloro-4-benzoylaminoanthraquinone and carbazolising the so-obtained linear polyanthrimide with anhydrous aluminum chloride and pyridine at a temperature between 100–220° C.

6. A process for the manufacture of a vat dyestuff which comprises condensing at a raised temperature in the presence of a high boiling solvent with the addition of an acid binding agent one mol of 1.4-diamino-6,7-dichloroanthraquinone with 0.5 mol of 1,4-dichloranthraquinone and 1 mol of 1-chloranthraquinone and carbazolizing the so-obtained linear polyanthrimide with anhydrous aluminum chloride and pyridine at a temperature between 100–220° C.

7. The vat dyestuffs which are obtained by the process which comprises condensing one molecular proportion of a member selected from the group consisting of 1,4-diaminoanthraquinone and a chlorosubstituted 1,4-diaminoanthraquinone with 0.2 to 2 molecular proportions of a member selected from the group consisting of 1,4-dichloroanthraquinone, a chlorinated 1,4-dichloroanthraquinone, and 1,4-dichlor-5-benzoylaminoanthraquinone, and with 0–2 molecular proportions of a member selected from the group consisting of 1-chloro-4-aminoanthraquinone and 1-chloro-4-benzoylaminoanthraquinone, the molecular ratio of all the reaction components relatively to one another being so chosen that the ratio of the exchangeable chlorine atoms in the reaction mixture to the amino group therein is 0.6:1 to 2:1, and carbazolizing the so-obtained linear polyanthrimide with anhydrous aluminum chloride and a pyridine base at a temperature from 100 to 220° C.

References Cited in the file of this patent

UNITED STATES PATENTS 2,030,253   Hauser et al. _____ Feb. 11, 1936

FOREIGN PATENTS 693,075   Great Britain _____ June 24, 1953

OTHER REFERENCES

Synthetic Dues, Venkatarman, 1952, Academic Press Inc., New York, N.Y., p. 908.